(12) United States Patent
Harrisson et al.

(10) Patent No.: US 11,267,923 B2
(45) Date of Patent: *Mar. 8, 2022

(54) MULTIBLOCK AMPHIPHILIC POLYMERS

(71) Applicant: RHODIA OPERATIONS, Paris (FR)

(72) Inventors: Simon Harrisson, Toulouse (FR); James Wilson, Coye-la-Foret (FR)

(73) Assignee: RHODIA OPERATIONS, Aubervilliers (FR)

(*) Notice: Subject to any disclaimer, the term of this patent is extended or adjusted under 35 U.S.C. 154(b) by 0 days.

This patent is subject to a terminal disclaimer.

(21) Appl. No.: 16/655,475

(22) Filed: Oct. 17, 2019

(65) Prior Publication Data

US 2020/0048391 A1 Feb. 13, 2020

Related U.S. Application Data

(63) Continuation of application No. 15/128,162, filed on Sep. 22, 2016, now Pat. No. 10,450,397.

(30) Foreign Application Priority Data

Mar. 24, 2014 (FR) .................... 14/00709

(51) Int. Cl.
*C08F 2/22* (2006.01)
*C08F 2/26* (2006.01)
*C08F 2/38* (2006.01)
*C08F 220/56* (2006.01)
*C08F 293/00* (2006.01)

(52) U.S. Cl.
CPC ............ *C08F 293/005* (2013.01); *C08F 2/22* (2013.01); *C08F 2/26* (2013.01); *C08F 2/38* (2013.01); *C08F 220/56* (2013.01); *C08F 293/00* (2013.01)

(58) Field of Classification Search
CPC ...... C08F 2/22; C08F 2/26; C08F 2/38; C08F 220/56; C08F 293/00; C08F 293/005
See application file for complete search history.

(56) References Cited

U.S. PATENT DOCUMENTS

2014/0378617 A1  12/2014  Wilson et al.

FOREIGN PATENT DOCUMENTS

WO    2013060741 A1    5/2013

OTHER PUBLICATIONS

Methyl acrylate data sheet downloaded from http://www.inchem.org/documents/icsc/icsc/eics0625.htm (Year: 2018).*

* cited by examiner

*Primary Examiner* — Irina S Zemel
*Assistant Examiner* — Jeffrey S Lenihan
(74) *Attorney, Agent, or Firm* — Osha Bergman Watanabe & Burton LLP

(57) ABSTRACT

The present invention relates to a process for preparing a polymer with a mass Mw of less than 300 000 g/mol (especially between 1000 and 300 000 g/mol), comprising a step (E) of controlled radical polymerization in which the following are placed in contact in an aqueous medium in which are dispersed surfactant micelles:
  ethylenically unsaturated hydrophilic monomers predominantly present in the aqueous medium;
  partially water-soluble ethylenically unsaturated hydrophobic monomers different from the preceding monomers, at least partly present in the surfactant micelles, and having a solubility in the aqueous medium at least equal to that of hexyl acrylate;
at least one radical polymerization initiator; and
at least one radical polymerization control agent.

16 Claims, No Drawings

MULTIBLOCK AMPHIPHILIC POLYMERS

This application is a continuation of U.S. application Ser. No. 15/128,162, filed on Sep. 22, 2016, which is a U.S. national phase entry under 35 U.S.C. § 371 of International Application No. PCT/EP2015/055436, filed on Mar. 16, 2015, which claims priority to French Application No. 14/00709, filed on Mar. 24, 2014. The entire contents of these applications are incorporated herein by this reference.

The present invention relates to the field of amphiphilic polymers that are useful especially as modifiers of surface or interface properties.

Various polymers of this type have been described, among which mention may be made of amphiphilic copolymers of diblock type, which comprise two blocks of radically opposing nature, namely a markedly hydrophobic first block linked to a markedly hydrophilic block. Due to the presence of two very different blocks, these copolymers are particularly active at a surface/interface. However, in counterpart, due to the very different nature of these two blocks, these copolymers tend to self-assemble, typically to form micelles or other objects, in which the polymers are no longer available for surface/interface modification. In aqueous medium, for example, the hydrophobic blocks of these polymers have a marked tendency to interact strongly in the self-assembled structure, which becomes, as it were, kinetically "fixed" (the blocks typically combine together relatively irreversibly in the core of the micelles).

Moreover, amphiphilic polymers of random type, which are less markedly polarized, have been described, especially in Polymer Chemistry 2014, 5, 819. They are generally polymer chains predominantly containing hydrophilic units, within which are randomly dispersed highly hydrophobic units present in small number. With amphiphilic polymers of this type, there is less risk of self-assembly and it is possible, in absolute terms, to globally modify the physicochemical properties, given the combined presence of the hydrophobic and hydrophilic units. Nevertheless, on account of the random nature of these copolymers, it often proves to be difficult to finely control these properties, in particular for polymers of high mass. Furthermore, as a general rule, random polymers are not optimally anchored on the surfaces or interfaces, which may especially be reflected by a loss of performance over time, or even insufficient efficacy for certain applications.

One aim of the present invention is to provide a novel type of polymer that makes it possible to limit the risks of self-assembly while at the same time optimizing reactivity of the polymers that is capable of ensuring efficient surface or interface modification.

To this end, the present invention provides access to polymers typically of low mass, which may be obtained according to a controlled radical polymerization process performed under specific conditions.

More precisely, according to a first aspect, a subject of the present invention is a process for preparing a polymer which preferably has a weight-average molecular mass Mw of at most 300 000 g/mol, especially between 1000 and 300 000 g/mol (this mass is, for example, greater than 100 000 g/mol, and, independently, it is advantageously less than 300 000 g/mol), comprising a polymerization step (E) in which the following are placed in contact in aqueous medium (M) in which are dispersed surfactant micelles:

ethylenically unsaturated monomers M1 predominantly present in the aqueous medium, referred to hereinbelow as "hydrophilic monomers";

ethylenically unsaturated monomers M2 different from the hydrophilic monomers, at least partly present in the surfactant micelles, and having a solubility in the aqueous medium (M) at the implementation temperature of step (E) at least equal to that of hexyl acrylate, referred to hereinbelow as "partially water-soluble hydrophobic monomers";

at least one radical polymerization initiator, which is preferably water-soluble or water-dispersible; and at least one radical polymerization control agent.

According to another aspect, the invention relates to polymers of the type obtained according to the abovementioned process, the mass of which may be finely controlled by means of the preparation method of the invention, and also to various uses of these polymers, described in greater detail hereinbelow, in particular as surface modifiers, surfactants, dispersants or associative thickeners.

The polymers as obtained according to the abovementioned step (E) have a very specific structure which combines the advantages of a block structure and of a random structure:

due to the use of surfactant micelles and of a control agent, step (E) allows controlled orientation of the distribution of the monomers, with a structure of "multiblock" type, namely with an alternation of zones that may be likened to blocks, alternately hydrophobic and hydrophilic, with a direct effect on the efficacy of the polymer (surface/interface modification; anchoring at the surface/interface). This structure of "multiblock" type proves to be better than a random structure, in which the partially water-soluble hydrophobic monomer units are separated by long segments of hydrophilic monomers. On the contrary, according to the invention, the effect of the partially water-soluble hydrophobic monomer units is optimized, which is reflected especially in terms of improvement of the anchoring force of the polymers;

given the use of partially water-soluble monomers M2, step (E) also leads to a dispersion of hydrophobic units in the hydrophilic zones, with an associated modulation effect close to that authorized with random polymerization, the control of this modulation also being improved due to the use of the control agent.

It has also been demonstrated in the context of the present invention that the conditions of step (E) make it possible to obtain polymers of controlled mass, which may be chosen especially to be low, typically with a mass (Mw) of less than 300 000 g/mol, or even less than 250 000 g/mol.

For the purposes of the present description, the term "weight-average molecular mass" or "weight-average molar mass", noted Mw, means the average mass of a population of polymers defined by the average of the molecular masses of the polymer chains weighted by the mass of the chains of each length. In practice, the Mw of a polymer population may typically be measured by chromatography, typically by GC or HPLC.

Advantageous conditions for performing step (E) are described in greater detail hereinbelow.

Monomers M2

These are ethylenically unsaturated monomers having a solubility in water that is sufficient for the monomers M2 to be present in non-negligible amount in the aqueous medium (M) of step (E), but nevertheless low enough for a non-negligible part (and generally a markedly predominant part) of these monomers M2 to be present in micelles. To this end, the monomers M2 have a solubility in the aqueous medium (M) which is at least equal to that of a hexyl acrylate, preferentially greater than or equal to 100 ppm, i.e. at least 0.01 g/100 g in water at the implementation temperature of step (E), this solubility in the aqueous medium (M) preferably being greater than or equal to 500 ppm (0.05 g/100 g in water at the implementation temperature). Moreover, it is preferable for the solubility of the monomers M2 in the aqueous medium (M) to remain less than 20 000 ppm.

As a general rule, use may be made of monomers M2 whose solubility in water is between the abovementioned values (typically between 100 ppm and 20 000 ppm), but it is clearly understood that monomers with a solubility in water outside this range may be used: depending on the exact nature of the aqueous medium of step (E); optional presence of additives or solvents especially), the solubility in the aqueous medium (M) may differ appreciably relative to the solubility in water.

Advantageously, the monomers M2 have a LogP of less than or equal to 3.3 and this LogP advantageously remains in general greater than or equal to 1.2. For the purposes of the present description, the term "LogP" means the base 10 logarithm of the ratio of the concentrations of the test substance in octanol and in water.

As nonlimiting examples of monomers M2 that may be used according to the invention, mention may be made especially of:
- vinylaromatic monomers, such as styrene, α-methylstyrene, para-chloromethylstyrene, vinyltoluene, 2-methylstyrene, 4-methylstyrene, 2-(n-butyl)styrene or p-styrenecarboxylic acid (p-styrenecarboxylic acid proves to be especially advantageous);
- esters of α,β-ethylenically unsaturated monocarboxylic or dicarboxylic acids with C2-C12 alkanols, for example methyl ethacrylate, ethyl (meth)acrylate, ethyl ethacrylate, n-propyl (meth)acrylate, isopropyl (meth)acrylate, n-butyl (meth)acrylate, sec-butyl (meth)acrylate, tert-butyl (meth)acrylate, tert-butyl ethacrylate, n-hexyl (meth)acrylate, n-heptyl (meth)acrylate, n-octyl (meth)acrylate, 1,1,3,3-tetramethylbutyl (meth)acrylate, ethylhexyl (meth)acrylate, n-nonyl (meth)acrylate, n-decyl (meth)acrylate, n-undecyl (meth)acrylate, tridecyl (meth)acrylate, myristyl (meth)acrylate, pentadecyl (meth)acrylate, palmityl (meth)acrylate, heptadecyl (meth)acrylate, nonadecyl (meth)acrylate, arachinyl (meth)acrylate, behenyl (meth)acrylate, lignoceryl (meth)acrylate, cerotinyl (meth)acrylate, melissinyl (meth)acrylate, palmitoleoyl (meth)acrylate, oleyl (meth)acrylate, linolyl (meth)acrylate, linolenyl (meth)acrylate, stearyl (meth)acrylate, lauryl (meth)acrylate and mixtures thereof;
- esters of vinyl or allyl alcohol with C1-C12 monocarboxylic acids, for example vinyl formate, vinyl acetate, vinyl butyrate, vinyl laurate, vinyl propionate or vinyl versatate, and mixtures thereof;
- ethylenically unsaturated nitriles, such as acrylonitrile or methacrylonitrile, and mixtures thereof;
- esters of α,β-ethylenically unsaturated monocarboxylic and dicarboxylic acids with C4-C12 alkanediols, for example 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate and 3-hydroxy-2-ethylhexyl methacrylate;
- primary amides of α,β-ethylenically unsaturated monocarboxylic and dicarboxylic acids and N-alkyl and N,N-dialkyl derivatives, such as N-propyl(meth)acrylamide, N-(n-butyl)(meth)acrylamide, N-(tert-butyl)(meth)acrylamide, N-(n-octyl)(meth)acrylamide, N-(1,1,3,3-tetramethylbutyl)(meth)acrylamide, N-ethylhexyl(meth)acrylamide, N-(n-nonyl)(meth)acrylamide, N-(n-decyl)(meth)acrylamide and N-(n-undecyl)(meth)acrylamide;
- N-vinyllactams and derivatives thereof, such as N-vinyl-5-ethyl-2-pyrrolidone, N-vinyl-6-methyl-2-piperidone, N-vinyl-6-ethyl-2-piperidone, N-vinyl-7-methyl-2-caprolactam and N-vinyl-7-ethyl-2-caprolactam;
- esters of α,β-ethylenically unsaturated monocarboxylic and dicarboxylic acids with amino alcohols, for example N,N-dimethylaminocyclohexyl (meth)acrylate;
- amides of α,β-ethylenically unsaturated monocarboxylic and dicarboxylic acids with diamines comprising at least one primary or secondary amino group, for example N-[2-(diethylamino)ethyl]acrylamide, N-[4-(dimethylamino)cyclohexyl]acrylamide and N-[4-(dimethylamino)cyclohexyl]methacrylamide; and
- C2-C8 monoolefins such as ethylene, propylene, isobutylene and nonaromatic hydrocarbons comprising at least two conjugated double bonds, for example isoprene or butadiene.

According to a preferential embodiment, the monomers M2 used according to the invention are chosen from:
- α,β-unsaturated alkyl esters of C1-8 alkyl, preferably of C2-6 alkyl, in particular alkyl acrylates and methacrylates, such as methyl, ethyl, butyl and hexyl acrylates and methacrylates;
- α,β-unsaturated alkylamides of C1-C8 alkyl, preferably of C2-C6 alkyl, in particular alkyl acrylamides and methacrylamides, such as methyl, ethyl, butyl and hexyl acrylamides and methacrylamides;
- vinyl or allyl alcohol esters of saturated carboxylic acids, such as vinyl or allyl acetate, propionate or versatate;
- α,β-unsaturated nitriles containing from 3 to 6 carbon atoms, such as acrylonitrile;
- p-styrenecarboxylic acid;
- α-olefins and conjugated dienes;
- mixtures and combinations of two or more of the abovementioned monomers.

Preferentially, the partially water-soluble hydrophobic monomers of step (E) are chosen from ethyl (meth)acrylate, ethyl ethacrylate, n-propyl (meth)acrylate, isopropyl (meth)acrylate, n-butyl (meth)acrylate, sec-butyl (meth)acrylate, tert-butyl (meth)acrylate, tert-butyl ethacrylate and n-hexyl acrylate.

Surfactant Micelles

The surfactant micelles containing the monomers M2 used in step (E) may be based on any suitable surfactant. As nonlimiting examples, use may be made of one or more surfactants chosen from the following list:

The anionic surfactants may be chosen from:
- alkyl ester sulfonates, for example of formula R—CH(SO$_3$M)-CH$_2$COOR', or alkyl ester sulfates, for example of formula R—CH(OSO$_3$M)-CH$_2$COOR', where R represents a $C_8$-$C_{20}$ and preferably $C_{10}$-$C_{16}$ alkyl radical, R' represents a $C_1$-$C_6$ and preferably $C_1$-$C_3$ alkyl radical and M represents an alkali metal cation, for example the sodium cation, or the ammonium cation. Mention may very particularly be made of methyl ester sulfonates, the R radical of which is a $C_{14}$-$C_{16}$ radical; alkylbenzenesulfonates, more particularly $C_9$-$C_{20}$ alkylbenzenesulfonates, primary or secondary alkylsulfonates, in particular $C_8$-$C_{22}$ alkylsulfonates, or alkylglycerolsulfonates;

alkyl sulfates, for example of formula $ROSO_3M$, where R represents a $C_{10}$-$C_{24}$ and preferably $C_{12}$-$C_{20}$ alkyl or hydroxyalkyl radical and M represents a cation with the same definition as above;

alkyl ether sulfates, for example of formula $RO(OA)_nSO_3M$, where R represents a $C_{10}$-$C_{24}$ and preferably $C_{12}$-$C_{20}$ alkyl or hydroxyalkyl radical, OA represents an ethoxylated and/or propoxylated group, M represents a cation with the same definition as above and n generally ranges from 1 to 4, for instance lauryl ether sulfate with n=2;

alkylamide sulfates, for example of formula $RCONHR'OSO_3M$, where R represents a $C_2$-$C_{22}$ and preferably $C_6$-$C_{20}$ alkyl radical, R' represents a $C_2$-$C_3$ alkyl radical and M represents a cation with the same definition as above, and also the polyalkoxylated (ethoxylated and/or propoxylated) derivatives thereof (alkylamide ether sulfates);

salts of saturated or unsaturated fatty acids, for instance $C_8$-$C_{24}$ and preferably $C_{14}$-$C_{20}$ acids, and of an alkaline-earth metal cation, N-acyl N-alkyltaurates, alkylisethionates, alkylsuccinamates and alkyl sulfosuccinates, alkylglutamates, monoesters or diesters of sulfosuccinates, N-acylsarcosinates or polyethoxycarboxylates;

monoester and diester phosphates, for example having the following formula: $(RO)_x$—$P(=O)(OM)_{x'}$, where R represents an optionally polyalkoxylated alkyl, alkylaryl, arylalkyl or aryl radical, x and x' are equal to 1 or 2, provided that the sum of x and x' is equal to 3, and M represents an alkaline-earth metal cation;

The nonionic surfactants may be chosen from:

alkoxylated fatty alcohols, for example laureth-2, laureth-4, laureth-7 or oleth-20, alkoxylated triglycerides, alkoxylated fatty acids, alkoxylated sorbitan esters, alkoxylated fatty amines, alkoxylated di(1-phenylethyl)phenols, alkoxylated tri(1-phenylethyl)phenols, alkoxylated alkylphenols, the products resulting from the condensation of ethylene oxide with a hydrophobic compound resulting from the condensation of propylene oxide with propylene glycol, such as the Pluronic products sold by BASF, the products resulting from the condensation of ethylene oxide the compound resulting from the condensation of propylene oxide with ethylenediamine, such as the Tetronic products sold by BASF, alkylpolyglycosides, such as those described in U.S. Pat. No. 4,565,647, or alkylglucosides; fatty acid amides, for example C8-C20 fatty acid amides, in particular fatty acid monoalkanolamides, for example cocamide MEA or cocamide MIPA;

The amphoteric surfactants (true amphoteric species comprising an ionic group and a potentially ionic group of opposite charge, or zwitterionic species simultaneously comprising two opposite charges) may be:

betaines generally, in particular carboxybetaines, for example lauryl betaine (Mirataine BB from Rhodia) or octyl betaine or cocoyl betaine (Mirataine BB-FLA from Rhodia); amidoalkyl betaines, such as cocamidopropyl betaine (CAPB) (Mirataine BDJ from Rhodia or Mirataine BET C-30 from Rhodia);

sulfobetaines or sultaines, such as cocamidopropyl hydroxysultaine (Mirataine CBS from Rhodia);

alkylamphoacetates and alkylamphodiacetates, for instance comprising a cocoyl or lauryl chain (Miranol C2M Conc. NP, C32, L32 especially, from the company Rhodia);

alkylamphopropionates or alkylamphodipropionates, (Miranol C2M SF);

alkyl amphohydroxypropyl sultaines (Miranol CS);

alkylamine oxides, for example lauramine oxide (INCI);

The cationic surfactants may be optionally polyethoxylated primary, secondary or tertiary fatty amine salts, quaternary ammonium salts, such as tetraalkylammonium, alkylamidoalkylammonium, trialkylbenzylammonium, trialkylhydroxyalkylammonium or alkylpyridinium chlorides or bromides, imidazoline derivatives or amine oxides of cationic nature. An example of a cationic surfactant is cetrimonium chloride or bromide (INCI).

The surfactants used according to the present invention may be block copolymers comprising at least one hydrophilic block and at least one hydrophobic block different from the hydrophilic block, which are advantageously obtained according to a polymerization process in which:

($a_0$) at least one hydrophilic (or, respectively, hydrophobic) monomer, at least one source of free radicals and at least one radical polymerization control agent of the —S(C=S)— type are placed in contact within an aqueous phase;

($a_1$) the polymer obtained on conclusion of step ($a_0$) is placed in contact with at least one hydrophobic (or, respectively, hydrophilic) monomer different from the monomer used in step ($a_0$) and at least one source of free radicals;

via which a diblock copolymer is obtained.

Polymers of the triblock type, or comprising more blocks, may optionally be obtained by performing, after step ($a_1$), a step ($a_2$) in which the polymer obtained on conclusion of step ($a_1$) is placed in contact with at least one monomer different from the monomer used in step ($a_1$) and at least one source of free radicals; and more generally by performing (n+1) steps of the type of the abovementioned steps ($a_1$) and ($a_2$) and n is an integer typically ranging from 1 to 3, where, in each step ($a_n$), with n≥1, the polymer obtained on conclusion of step ($a_{n-1}$) is placed in contact with at least one monomer different from the monomer used in step ($a_{n-1}$) and at least one source of free radicals. Use may be made, for example, according to the invention, of the copolymers of the type which are described in WO 03068827, WO 03068848 and WO 2005/021612.

According to one embodiment, the monomers M2 are in surfactant micelles formed in step (E), into which this surfactant is introduced at a concentration above its critical micelle concentration (cmc).

According to a particular embodiment, the monomers M2 may be monomers which, by themselves, have the property of forming micelles without needing to add additional surfactants (monomers referred to as being "self-micellizable" in the rest of the description). According to this specific embodiment, the surfactant used may be the self-micellizable hydrophobic monomer itself, used without other surfactant, although the presence of such an additional surfactant is not excluded. Thus, for the purposes of the present description, when mention is made of monomers in surfactant micelles, this notion encompasses both (i) hydrophobic monomers present in surfactant micelles other than these monomers, and (ii) "self-micellizable" monomers forming by themselves micelles in aqueous medium. The two abovementioned modes (i) and (ii) are compatible and may coexist (hydrophobic monomers within micelles formed by another self-micellizable monomer for example, or else micelles comprising a combination of surfactants and self-micellizable monomers).

The Aqueous Medium (M)

The aqueous medium (M) used in step (E) is a medium comprising water, preferably in a proportion of at least 50% by mass, or even at least 80%, for example at least 90%, or even at least 95%. This aqueous medium may optionally comprise solvents other than water, for example a water-miscible alcohol. Thus, the medium (M) may be, for example, an aqueous-alcoholic mixture. According to one possible variant, the medium (M) may comprise other solvents, preferably in a concentration in which said solvent is water-miscible, which may especially make it possible to reduce the amount of stabilizing surfactants used. Thus, for example, the medium (M) may comprise pentanol, or any other additive for adjusting the aggregation number of the surfactants. In general, it is preferable for the medium (M) to be a continuous phase of water consisting of one or more solvents and/or additives that are miscible with each other and in water in the concentrations at which they are used.

The Radical Polymerization Control Agent

For the purposes of the present description, the term "radical polymerization control agent" means a compound which is capable of extending the lifetime of the growing polymer chains in a polymerization reaction and of conferring, on the polymerization, a living or controlled nature. This control agent is typically a reversible transfer agent as used in controlled radical polymerization denoted by the terminology RAFT or MADIX, which typically use a reversible addition-fragmentation transfer process, such as those described, for example, in WO 96/30421, WO 98/01478, WO 99/35178, WO 98/58974, WO 00/75207, WO 01/42312, WO 99/35177, WO 99/31144, FR 2794464 or WO 02/26836.

According to an advantageous embodiment, the radical polymerization control agent used in step (E) is a compound which comprises a thiocarbonylthio group —S(C=S)—. Thus, for example, it may be a compound which comprises at least one xanthate group (bearing —SC=S—O— functions), for example one or two xanthates. According to one embodiment, the compound comprises several xanthates. Other types of control agent may be envisaged (for example of the type used in ATRP or NMP).

According to a specific embodiment, the control agent used in step (E) may be a polymer chain derived from a controlled radical polymerization and bearing a group that is capable of controlling a radical polymerization (polymer chain of "living" type, which is a type well known per se). Thus, for example, the control agent may be a polymer chain (preferably hydrophilic or water-dispersible) functionalized at the chain end with a xanthate group or more generally comprising an —SC=S— group, for example obtained according to the MADIX technology.

Alternatively, the control agent used in step (E) is a non-polymer compound bearing a group that ensures control of the radical polymerization, especially a thiocarbonylthio group —S(C=S)—.

According to a particular variant, the radical polymerization control agent used in step (E) is a polymer, advantageously an oligomer, of water-soluble or water-dispersible nature and bearing a thiocarbonylthio —S(C=S)— group, for example a xanthate —SC=S—O— group. This polymer, which is capable of acting both as control agent for the polymerization and as monomer in step (E), is also denoted by "prepolymer" in the rest of the description. Typically, this prepolymer is obtained by radical polymerization of hydrophilic monomers in the presence of a control agent bearing a thiocarbonylthio —S(C=S)— group, for example a xanthate. Thus, for example, according to an advantageous embodiment which is illustrated at the end of the present description, the control agent used in step (E) may advantageously be a prepolymer bearing a thiocarbonylthio —S(C=S)— group, for example a xanthate —SC=S—O— group, obtained on conclusion of a step (E⁰) of controlled radical polymerization prior to step (E). In this step (E⁰), hydrophilic monomers (M0), advantageously identical to those used in step (E), a radical polymerization initiator and a control agent bearing a thiocarbonylthio —S(C=S)— group, for example a xanthate, may typically be placed in contact.

According to one embodiment, the radical polymerization control agent is an oligomer of water-soluble or water-dispersible nature bearing a thiocarbonylthio —S(C=S)— group, for example a xanthate —SC=S—O— group, which
 is soluble (or dispersible) in the aqueous medium (M) used in step (E); and/or
 is not capable of penetrating into the micelles of the micellar solution.

According to a particular embodiment, the control agent is both soluble (or dispersible) in the aqueous medium (M), and capable of partly penetrating into the micelles of the micellar solution.

The use of the abovementioned step (E⁰) prior to step (E) makes it possible, schematically, to hydrophilize a large number of control agents bearing thiocarbonylthio functional groups (for example xanthates, which are rather hydrophobic in nature), by converting them from prepolymers that are soluble or dispersible in the medium (M) of step (E). Preferably, a prepolymer synthesized in step (E⁰) has a short polymer chain, for example comprising a sequence of less than 50 monomer units, or even less than 25 monomer units, for example between 2 and 15 monomer units.

According to a preferential embodiment, the monomers (M0) are (meth)acrylic acid monomers, whereby the control agent is a poly(meth)acrylic acid bearing at least one xanthate group and the polymer having the specific structure obtained according to step (E) also with a poly(meth)acrylic acid block linked at one of its ends.

The control agent used in step (E) or, where appropriate, in step (E⁰) of the process of the invention is advantageously a compound bearing a thiocarbonylthio —S(C=S)— group. Usually, the control agent bears only one thiocarbonylthio group.

However, according to a particular embodiment, the control agent may bear several thiocarbonylthio groups.

Thus, this control agent may, for example, correspond to formula (A) below:

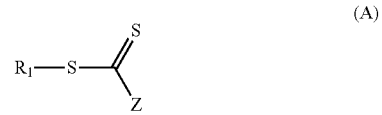

(A)

in which:
 Z represents:
  a hydrogen atom,
  a chlorine atom,
  an optionally substituted alkyl or optionally substituted aryl radical,
  an optionally substituted heterocycle,
  an optionally substituted alkylthio radical,
  an optionally substituted arylthio radical,
  an optionally substituted alkoxy radical, an optionally substituted aryloxy radical,
an optionally substituted amino radical,
an optionally substituted hydrazine radical,
an optionally substituted alkoxycarbonyl radical,
an optionally substituted aryloxycarbonyl radical,
an optionally substituted acyloxy or carboxyl radical,
an optionally substituted aroyloxy radical,
an optionally substituted carbamoyl radical,
a cyano radical,
a dialkyl- or diarylphosphonato radical,
a dialkyl-phosphinato or diaryl-phosphinato radical, or
a polymer chain,
and
$R_1$ represents:
an optionally substituted alkyl, acyl, aryl, aralkyl, alkenyl or alkynyl group,
a saturated or unsaturated, aromatic, optionally substituted carbocycle or heterocycle, or
a polymer chain, which is preferably hydrophilic or water-dispersible when the agent is used in step (E).

The groups $R_1$ or Z, when they are substituted, may be substituted with optionally substituted phenyl groups, optionally substituted aromatic groups, saturated or unsaturated carbocycles, saturated or unsaturated heterocycles, or groups chosen from the following: alkoxycarbonyl or aryloxycarbonyl (—COOR), carboxyl (—COOH), acyloxy (—$O_2$CR), carbamoyl (—$CONR_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—$NR_2$), halogen, perfluoroalkyl allyl, epoxy, alkoxy (—OR), S-alkyl, S-aryl, groups of hydrophilic or ionic nature, such as alkali metal salts of carboxylic acids, alkali metal salts of sulfonic acids, polyalkylene oxide (PEO, PPO) chains, cationic substituents (quaternary ammonium salts), R representing an alkyl or aryl group, or a polymer chain.

For the control agents of formula (A) used in step (E), it is generally preferred for the group R1 to be of hydrophilic nature. Advantageously, it is a water-soluble or water-dispersible polymer chain.

The group R1 may alternatively be amphiphilic, i.e. it may have both hydrophilic and lipophilic nature. It is preferable for R1 not to be hydrophobic.

As regards the control agents of formula (A) used in step ($E^0$), $R_1$ may typically be a substituted or unsubstituted, preferably substituted, alkyl group. A control agent of formula (A) used in step ($E^0$) may nevertheless comprise other types of groups $R_1$, in particular a ring or a polymer chain.

The optionally substituted alkyl, acyl, aryl, aralkyl or alkyne groups generally bear from 1 to 20 carbon atoms, preferably from 1 to 12 and more preferentially from 1 to 9 carbon atoms. They may be linear or branched. They may also be substituted with oxygen atoms, in particular in the form of esters, sulfur atoms or nitrogen atoms.

Among the alkyl radicals, mention may be made especially of the methyl, ethyl, propyl, butyl, pentyl, isopropyl, tert-butyl, pentyl, hexyl, octyl, decyl or dodecyl radical.

The alkyne groups are radicals generally of 2 to 10 carbon atoms; they bear at least one acetylenic unsaturation, such as the acetylenyl radical.

The acyl group is a radical generally bearing from 1 to 20 carbon atoms with a carbonyl group.

Among the aryl radicals, mention may be made especially of the phenyl radical, which is optionally substituted, in particular with a nitro or hydroxyl function.

Among the aralkyl radicals, mention may be made especially of the benzyl or phenethyl radical, which is optionally substituted, in particular with a nitro or hydroxyl function.

When $R_1$ or Z is a polymer chain, this polymer chain may result from a radical or ionic polymerization or from a polycondensation.

Advantageously, use is made, as control agent for step (E) and also for step)($E^\circ$, where appropriate, of compounds bearing a xanthate —S(C=S)O—, trithiocarbonate, dithiocarbamate or dithiocarbazate function, for example compounds bearing an O-ethyl xanthate function of formula —S(C=S)$OCH_2CH_3$.

When step ($E^0$) is performed, it is in particular advantageous to use, as control agents in this step, a compound chosen from xanthates, trithiocarbonates, dithiocarbamates and dithiocarbazates. Xanthates prove to be very particularly advantageous, in particular those bearing an O-ethyl xanthate —S(C=S)$OCH_2CH_3$ function, such as O-ethyl S-(1-(methoxycarbonyl)ethyl) xanthate ($CH_3CH(CO_2CH_3)$)S(C=S)OEt. Another possible control agent in step ($E^0$) is dibenzyl trithiocarbonate of formula $PhCH_2$S(C=S)$SCH_2Ph$ (where Ph=phenyl).

The living prepolymers obtained in step ($E^0$) by using the abovementioned control agents prove to be particularly advantageous for performing step (E).

Monomers M1

Typically, the monomers M1 used in the process of the invention may comprise monomers chosen from:
ethylenically unsaturated carboxylic acids, sulfonic acids and phosphonic acids, and/or derivatives thereof such as acrylic acid (AA), methacrylic acid, ethacrylic acid, α-chloroacrylic acid, crotonic acid, maleic acid, maleic anhydride, itaconic acid, citraconic acid, mesaconic acid, glutaconic acid, aconitic acid, fumaric acid, monoethylenically unsaturated dicarboxylic acid monoesters comprising 1 to 3 and preferably 1 to 2 carbon atoms, for example monomethyl maleate, vinylsulfonic acid, (meth)allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acids, 2-acrylamido-2-methylpropanesulfonic acid, vinylphosphonic acid, α-methylvinylphosphonic acid and allylphosphonic acid;
esters of α,β-ethylenically unsaturated monocarboxylic and dicarboxylic acids with C2-C3 alkanediols, for example 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate and polyalkylene glycol (meth)acrylates;
α,β-ethylenically unsaturated monocarboxylic acid amides and the N-alkyl and N,N-dialkyl derivatives thereof, such as acrylamide, methacrylamide, N-methyl (meth)acrylamide, N-ethyl(meth)acrylamide, N-propyl (meth)acrylamide, N,N-dimethyl(meth)acrylamide, N,N-diethyl(meth)acrylamide, morpholinyl(meth) acrylamide, and metholylacrylamide (acrylamide and N,N-dimethyl(meth)acrylamide prove to be in particular advantageous);
N-vinyllactams and derivatives thereof, for example N-vinylpyrrolidone and N-vinylpiperidone;
open-chain N-vinylamide compounds, for example N-vinylformamide, N-vinyl-N-methylformamide, N-vinylacetamide, N-vinyl-N-methylacetamide, N-vinyl-N- ethylacetamide, N-vinylpropionamide, N-vinyl-N-methylpropionamide and N-vinylbutyramide;

esters of α,β-ethylenically unsaturated monocarboxylic and dicarboxylic acids with amino alcohols, for example N,N-dimethylaminomethyl (meth)acrylate, N,N-dimethylaminoethyl (meth)acrylate, N,N-diethylaminoethyl acrylate and N,N-dimethylaminopropyl (meth)acrylate, the acid-addition salts thereof and the quaternization products thereof, the alkyl used here preferentially being C1-C3 alkyl or benzyl;

amides of α,β-ethylenically unsaturated monocarboxylic and dicarboxylic acids with diamines comprising at least one primary or secondary amino group, such as N-[2-(dimethylamino)ethyl]acrylamide, N[2-(dimethylamino)ethyl]methacrylamide, N-[3-(dimethylamino)propyl]acrylamide, N-[3-(dimethylamino)propyl]methacrylamide, N-diallylamines and N,N-diallyl-N-alkylamines, the acid-addition salts thereof and the quaternization products thereof, the alkyl used here preferentially being C1-C3 alkyl or benzyl;

N,N-diallyl-amine and N,N-diallyl-N,N-dimethylammonium compounds, for example the chlorides and bromides;

nitrogenous heterocycles substituted with vinyl and allyl, for example N-vinylimidazole, N-vinyl-2-methylimidazole, heteroaromatic compounds substituted with vinyl and allyl, for example 2- and 4-vinylpyridine, 2- and 4-allylpyridine, and salts thereof;

sulfobetaines; and mixtures and combinations of two or more of the above-mentioned monomers.

According to a particular embodiment, these monomers may especially comprise acrylic acid (AA). According to a possible embodiment, the monomers are all acrylic acids, but it may also be envisioned to use as monomers a mixture comprising, inter alia, acrylic acid as a mixture with other hydrophilic monomers.

According to an advantageous embodiment, the monomers M1 of step (E) comprise (meth)acrylic acid and/or (meth)acrylamido monomers.

For the purposes of the present description, the term "(meth)acrylic acid" includes methacrylic acid and acrylic acid, and mixtures thereof.

Similarly, for the purposes of the present description, the term "(meth)acrylate" includes methacrylate and acrylate, and mixtures thereof.

Similarly, for the purposes of the present description, the term "(meth)acrylamide/(meth)acrylamido" includes methacrylamide/methacrylamido and acrylamide/acrylamido, and mixtures thereof.

The monomers containing acid groups may be used for the polymerization in the form of the free acid or in partially or totally neutralized form. KOH, NaOH, ammonia or another base may be used, for example, for the neutralization.

According to a particular embodiment, the monomers M1 used in the process of the invention are acrylic acid and/or methacrylic acid monomers, optionally totally or partially in the form of salts.

According to another embodiment, the monomers used in step (E) comprise (and typically are constituted of) (meth)acrylamide monomers, or more generally (meth)acrylamido monomers, including:

acrylamido monomers, namely acrylamide, the sulfonate derivative thereof (AMPS), the quaternary ammonium (APTAC) and sulfopropyl dimethylammonium propyl acrylamide. (AMPS, 2-acryloylamino-2-methylpropane-1-sulfonic acid, is most particularly advantageous);

methacrylamido monomers, such as sulfopropyldimethylammoniopropylmethacrylamide (SPP) or sulfohydroxypropyldimethylammoniopropylmethacrylamide.

Irrespective of their exact nature, the monomers of step (E) may be used at relatively high concentrations, typically at concentrations that would be sufficient to ensure the formation of a gel if step (E) was performed in the absence of a control agent.

Typically, the initial monomer concentration in the reaction medium of step (E) may range up to 40% by mass, or even up to 50% by mass, this concentration generally remaining less than 35% by mass relative to the total mass of the reaction medium. Moreover, this concentration is preferably at least 0.1% by mass, and typically at least 0.3% by mass. For example, the initial monomer concentration in the reaction medium of step (E) is between 0.5% and 30% and especially between 1% and 20% by mass relative to the total mass of the reaction medium.

According to a specific embodiment, the monomers M1 used in step (E) are heat-sensitive macromonomers, which are insoluble in water beyond a certain temperature (i.e. having a cloud point), but are soluble at lower temperature, step (E) being performed at a temperature below the cloud point. Macromonomers of this type typically bear a polymerizable function of (meth)acrylamido or (meth)acrylate type, and a side chain composed of ethylene oxide or propylene oxide sequences (random or in blocks), or alternatively based on N-isopropylacrylamide or N-vinylcaprolactam. This embodiment especially gives access to the preparation of polymers having heat-thickening properties, which may be used, for example, in the petroleum industry.

Preferably, in step (E), all the monomers M1 are dissolved and/or dispersed.

Initiation and Implementation of the Radical Polymerizations of Steps (E) and $(E^0)$ When it is used in step (E), the radical polymerization initiator is preferably water-soluble or water-dispersible. Besides this preferential condition, any radical polymerization initiator (source of free radicals) that is known per se and suited to the conditions chosen for these steps may be used in step (E) and step $(E^0)$ of the process of the invention.

Thus, the radical polymerization initiator used according to the invention may be chosen, for example, from the initiators conventionally used in radical polymerization. It may be, for example, one of the following initiators:

hydrogen peroxides, such as: tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, potassium persulfate or ammonium persulfate, azo compounds, such as: 2,2'-azobis(isobutyronitrile), 2,2'-azobis(2-butanenitrile), 4,4'-azobis(4-pentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis(2-methyl-N-hydroxyethyl]propionamide, 2,2'-azobis(N,N'-dimethyleneisobutyramidine) dichloride, 2,2'-azobis(2-amidinopropane) dichloride, 2,2'-azobis(N,N'-dimethyleneisobutyramide), 2,2'-azobis (2-methyl-N-[1,1-bis(hydroxymethyl)-2-hydroxyethyl]propionamide), 2,2'-azobis(2-methyl-N-[1,1-bis(hydroxymethylethyl]propionamide), 2,2'- azobis[2-methyl-N-(2-hydroxyethyl)propionamide] or 2,2'-azobis(isobutyramide) dihydrate, redox systems comprising combinations, such as:
mixtures of hydrogen peroxide, alkyl peroxide, peresters, percarbonates and the like and any of iron salts, titanous salts, zinc formaldehyde sulfoxylate or sodium formaldehyde sulfoxylate, and reducing sugars,
alkali metal or ammonium persulfates, perborates or perchlorates in combination with an alkali metal bisulfite, such as sodium metabisulfite, and reducing sugars, and
alkali metal persulfates in combination with an arylphosphinic acid, such as benzenephosphonic acid and the like, and reducing sugars.

Typically, the amount of initiator to be used is preferably determined so that the amount of radicals generated is at most 50 mol % and preferably at most 1 mol %, relative to the amount of control agent or transfer agent.

Most particularly in step (E), it generally proves to be advantageous to use a radical initiator of redox type, which has, inter alia, the advantage of not requiring heating of the reaction medium (no thermal initiation), and the inventors of which have in addition now discovered that it proves to be suitable for the micellar polymerization of step (E).

Thus, the radical polymerization initiator used in step (E) may typically be a redox initiator, typically not requiring heating for its thermal initiation. It is typically a mixture of at least one oxidizing agent with at least one reducing agent.

The oxidizing agent present in this redox system is preferably a water-soluble agent. This oxidizing agent may be chosen, for example, from peroxides, such as: hydrogen peroxide, tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, sodium persulfate, potassium persulfate, ammonium persulfate or also potassium bromate.

The reducing agent present in the redox system is also preferably a water-soluble agent. This reducing agent may typically be chosen from sodium formaldehyde sulfoxylate (in particular in its dihydrate form, known under the name Rongalit, or in the form of an anhydride), ascorbic acid, erythorbic acid, sulfites, bisulfites or metasulfites (in particular alkali metal sulfites, bisulfites or metasulfites), nitrilotrispropionamides, and tertiary amines and ethanolamines (which are preferably water-soluble).

Possible redox systems comprise combinations, such as:
mixtures of water-soluble persulfates with water-soluble tertiary amines,
mixtures of water-soluble bromates (for example, alkali metal bromates) with water-soluble sulfites (for example, alkali metal sulfites),
mixtures of hydrogen peroxide, alkyl peroxide, peresters, percarbonates and the like and any of iron salts, titanous salts, zinc formaldehyde sulfoxylate or sodium formaldehyde sulfoxylate, and reducing sugars,
alkali metal or ammonium persulfates, perborates or perchlorates in combination with an alkali metal bisulfite, such as sodium metabisulfite, and reducing sugars, and
alkali metal persulfates in combination with an arylphosphinic acid, such as benzenephosphonic acid and the like, and reducing sugars.

An advantageous redox system comprises (and preferably consists in) the combination of ammonium persulfate and sodium formaldehyde sulfoxylate.

Generally, and in particular in the case of the use of a redox system of the ammonium persulfate/sodium formaldehyde sulfoxylate type, it proves to be preferable for the reaction medium of step (E) to be free of copper. In the case of the presence of copper, it is generally desirable to add a copper-complexing agent, such as EDTA, in an amount capable of masking its presence.

Irrespective of the nature of the initiator used, the radical polymerization of step (E°) may be performed in any appropriate physical form, for example in solution in water or in a solvent, for example an alcohol or THF, in emulsion in water ("latex" process) or in bulk, where appropriate while controlling the temperature and/or the pH in order to render species liquid and/or soluble or insoluble.

After performing step (E), given the specific use of a control agent, polymers functionalized with transfer groups (living polymers) are obtained. This living character makes it possible, if desired, to use these polymers in a subsequent polymerization reaction, according to a technique that is well known per se.

Alternatively, if need be, it is possible to deactivate or destroy the transfer groups, for example by hydrolysis, ozonolysis or reaction with amines, for example, but in a nonlimiting manner, according to a transformation reaction as described in Moad, Rizzardo. *Polym. Int.* 2011, 60, 9-25.

Thus, according to a specific embodiment, the process of the invention may comprise, after step (E), a step (E1) of hydrolysis, of ozonolysis or of reaction with amines that is capable of deactivating and/or destroying all or part of the transfer groups present on the polymer prepared in step (E).

According to another embodiment, the process of the invention may comprise, after step (E) (optionally before or after the abovementioned step (E1) if said step is performed) an additional step (E2) of grafting at least one ethylenically unsaturated group onto the polymer as obtained on conclusion of step (E) or of step (E1), whereby polymers bearing an ethylenically unsaturated function are obtained, which may thus be used as ethylenically unsaturated monomers in a radical polymerization reaction. These particular polymers as obtained on conclusion of step (E2) will be denoted by the term "macromonomers" in the rest of the present description.

Step (E2) of grafting an ethylenically unsaturated group may be performed according to any means known per se. By way of nonlimiting illustration, this step (E2) may especially be performed as follows when the agent used is a xanthate:

According to a first embodiment, the xanthate function present at the end of the polymer chain obtained on conclusion of step (E) or, where appropriate, step (E1) is converted into a thiol function. This conversion may be typically performed via the method described in Biomacromolecules 8, 2950 (2007). The final function is then reacted with a dimethacrylate (a thiol-ene addition) to make a macromonomer of methacrylate type, for example, according to the method described in Journal of Polymer Science Part A: Polymer Chemistry, 47, 15, 3773.

According to a particular embodiment, the xanthate function bears a masked amine, typically a phthalimido present at the end of the polymer chain obtained on conclusion of step (E) or, where appropriate, step (E1). The synthesis of a xanthate with a phthalimido function is described especially in Macromolecules, 39, 2006, 5307-5318. The phthalimido function is converted into an amine function via the method described in Macromolecules, 39, 2006, 5293-5306. The amine function is then reacted with (meth)acrylic acid or anhydride to generate a macromonomer of (meth)acrylamido type.

Use of the Polymers of the Invention

The polymers as obtained on conclusion of step (E) and of the optional steps (E1) and/or (E2) described in the preceding paragraphs are, inter alia, useful for modifying a liquid/liquid, liquid/solid or liquid/gas interface, especially for stabilizing an emulsion or a foam or alternatively for increasing or reducing the wettability of a solid surface. They may be used as dispersants for organic or mineral pigments.

The polymers obtained on conclusion of step (E) and of the optional step (E1) described in the preceding paragraph may also be useful for regulating the rheology of liquid media, in particular when the mass of polymers is sufficiently high, especially aqueous media. A polymer according to the invention may be used, for example, for modifying the rheology of a cosmetic composition, of a household product, of a detergent composition or of a formulation intended for the agricultural sector. More specifically, the polymers as obtained according to the invention may prove to be advantageous as rheology regulators in the field of oil and natural gas extraction. They may be used in particular for making drilling fluids, for fracturing, for stimulation and for enhanced oil recovery.

Moreover, the nature of the polymers that may be synthesized according to the present invention is extremely modulable, which permits a very wide choice both on the backbone and on the presence of substituents, which may be judiciously chosen as a function of the envisioned uses of the polymer.

According to a particular aspect, the invention relates to the use of the polymers as obtained on conclusion of step (E2) as monomers (macromonomers) in a radical polymerization, preferably a controlled radical polymerization.

The macromonomers as obtained according to step (E2) bear one or more ethylenically unsaturated groups, typically only one unsaturated group at the end of the chain. This type of macromonomer may be copolymerized with other hydrophilic monomers to generate polymers that are typically of comb type: the copolymerization usually leads to the formation of a linear polymer chain incorporating the macromonomers ("base" of the comb), each of the macromonomers bearing a "multiblock" side chain as synthesized in step (E) ("tooth" of the comb). Alternatively, they may be used for the synthesis of star polymers. These macromonomers have advantageous associative properties and they may be used especially in solutions or in emulsions (direct or reverse).

Various aspects and advantages of the invention will be further illustrated by the examples below, in which polymers were prepared according to the process of the invention.

Examples

Starting Materials Used
Monomer M2:
EA=ethyl acrylate
BA=butyl acrylate
HA=hexyl acrylate
Monomer M1:
Am=acrylamide (solution at 50% in water)
SDS=sodium dodecyl sulfate
Rhodixan A1=5% by mass in ethanol
NaPS=sodium persulfate (1% by mass in water)
NaFS=sodium formaldehyde sulfoxylate (1% by mass in water)
Synthetic Protocol
For each example, the following steps were performed:
1. Introduction into a Reactor:
  of the solution of acrylamide (Am),
  of a hydrophobic monomer (EA, BA or HA depending on the case),
  of the solution of sodium dodecyl sulfonate (SDS),
  of the solution of Rhodixan A1,
  of the solution of sodium persulfate (NaPS), and
  of water,
  in the proportions given in table 1 below.
2. stirring at 240 rpm until the reaction medium is homogeneous.
3. degassing the medium by introducing nitrogen at a moderate flow rate for 10 minutes while maintaining the stirring (closed system).
4. adding the solution of NaFS.
5. degassing the medium by introducing nitrogen at a moderate flow rate for 10 minutes while maintaining the stirring (closed system).
6. reacting the medium obtained for 15 hours at room temperature (20° C.).

TABLE 1 proportions of the reagents used in the examples

| Example | monomer M1 (g) | monomer M2 (g) | Water added (g) | SDS (g) | Rhodixan A1 (g) | NaFS (g) | NaPS (g) |
|---|---|---|---|---|---|---|---|
| 1 | 21.32 | AB 4.81 | 23.33 | 12.23 | 4.29 | 5.12 | 5.33 |
| 2 | 21.32 | AB 4.81 | 20 | 20 | 0.43 | 5.12 | 2.33 |
| 3 | 14.22 | AB 8.33 | 34 | 12 | 0.43 | 3.41 | 3.55 |
| 4 | 14.22 | AB 8.33 | 23 | 20 | 4.28 | 3.41 | 3.55 |
| 5 | 11.37 | AE 11.61 | 42 | 13.8 | 4.8 | 1.42 | 1.14 |
| 6 | 11.37 | AE 11.61 | 40 | 21 | 0.48 | 1.42 | 1.14 |
| 7 | 14.22 | AH 3.91 | 24.9 | 8.9 | 0.31 | 1.78 | 1.42 |
| 8 | 14.22 | AH 3.91 | 16.5 | 14.4 | 3.05 | 1.78 | 1.42 |

Results
The polymers obtained were analyzed by HPLC, with the results reported in table 2 below:

TABLE 2 properties of the polymers obtained in the examples

| | Conversions | | Composition of the polymer | |
|---|---|---|---|---|
| Example | monomer M1 (% mol) | monomer M2 (% mol) | monomer M1 (% mol) | monomer M2 (% mol) |
| 1 | 99% | 95% | 79 | 19 |
| 2 | 99% | 96% | 80 | 20 |
| 3 | 99% | 93% | 58 | 39 |
| 4 | 99% | 97% | 60 | 40 |
| 5 | 99% | 99% | 40 | 60 |
| 6 | 90% | 82% | 38 | 58 |
| 7 | 96% | 80% | 77 | 17 |
| 8 | 98% | 95% | 79 | 20 |

The invention claimed is:

1. A process for preparing a polymer, the process comprising a polymerization step (E) in which the following are placed in contact in an aqueous medium (M) containing dispersed surfactant micelles:
  ethylenically unsaturated monomers M1 predominantly present in the aqueous medium, referred to as "hydrophilic monomer";
  ethylenically unsaturated monomers M2 different from the hydrophylic monomers, at least partly present in the surfactant micelles, and having a solubility in the aqueous medium (M) between 500 ppm and 20,000 ppm at the implementation temperature of step (E), referred to as "partially water-soluble hydrophobic monomers";
  at least one radical polymerization initiator; and
  at least one radical polymerization control agent.

2. The process as claimed in claim 1, wherein the radical polymerization control agent is a compound which comprises at least one thiocarbonylthio group —S(C=S)—.

3. The process according to claim 2, wherein the thiocarbonylthio group is a xanthate.

4. The process as claimed in claim 1, wherein the radical polymerization control agent is a prepolymer bearing at least one thiocarbonylthio group —S(C=S)— obtained on conclusion of a step ($E^o$), prior to step (E), said step ($E^o$) placing in contact
- monomers M0 bearing hydrophilic groups;
- a radical polymerization initiator; and
- a control agent bearing at least one thiocarbonylthio group —S(C=S)—.

5. The process as claimed in claim 4, wherein the monomers (M0) are (meth)acrylic acid monomers, whereby the control agent is a poly(meth)acrylic acid bearing at least one xanthate group and the polymer having the specific structure obtained according to step (E) also with a poly(meth)acrylic acid block linked at one of its ends.

6. The process according to claim 4, wherein the monomers M0 bearing hydrophilic groups are identical to the hydrophilic monomers of step (E).

7. The process according to claim 4, wherein the at least one thiocarbonylthio group —S(C=S)— of the control agent is a xanthate.

8. The process as claimed in claim 1, wherein the radical polymerization control agent is a water-soluble or water-dispersible oligomer bearing a thiocarbonylthio group —S(C=S)—, which
- is soluble or dispersible in the aqueous medium (M) used in step (E); and/or
- is not capable of penetrating into the micelles of the micellar solution.

9. The process as claimed in claim 1, wherein the hydrophilic monomers of step (E) are 2-acryloylamino-2-methylpropane-1-sulfonic acids (AMPS) or acrylamide or acrylic acid.

10. The process as claimed in claim 1, wherein the hydrophilic monomers of step (E) are 2-acryloylamino-2-methylpropane-1-sulfonic acids (AMPS) or acrylamide or acrylic acid.

11. The process as claimed in claim 1, wherein the partially water-soluble hydrophobic monomers of step (E) comprise acrylate monomers.

12. The process according to claim 11, wherein the acrylate monomers are selected from the group consisting of ethyl (meth)acrylate, ethyl ethacrylate, n-propyl (meth)acrylate, isopropyl (meth)acrylate, n-butyl (meth)acrylate, sec-butyl (meth)acrylate, tert-butyl (meth)acrylate, tert-butyl ethacrylate and n-hexyl acrylate.

13. The process according to claim 1, wherein the at least one radical polymerization initiator is water-soluble or water-dispersible.

14. The process according to claim 1, wherein the polymer is a multiblock polymer having alternating hydrophobic and hydrophilic zones, wherein the hydrophilic zones comprise a plurality of hydrophobic units dispersed therein.

15. A polymer with a weight-average molecular mass $M_w$ of greater than 100 000 g/mol and less than 300 000 g/mol obtained according to the process of claim 1.

16. A method
- for modifying a liquid/liquid, liquid/solid or liquid/gas interface;
- for regulating the rheology of a liquid medium; and/or
- for dispersing organic or mineral pigments comprising using the polymer as claimed in claim 15.

* * * * *